(12) United States Patent
Jensen et al.

(10) Patent No.: US 8,131,422 B2
(45) Date of Patent: Mar. 6, 2012

(54) SLIP CONTROL FOR A MATERIALS HANDLING VEHICLE

(75) Inventors: Eric L. Jensen, Troy, OH (US); David J. Obringer, Minster, OH (US); Nicholas J. Sherman, Minster, OH (US)

(73) Assignee: Crown Equipment Corporation, New Bremen, OH (US)

( * ) Notice: Subject to any disclaimer, the term of this patent is extended or adjusted under 35 U.S.C. 154(b) by 300 days.

(21) Appl. No.: 12/432,044

(22) Filed: Apr. 29, 2009

(65) Prior Publication Data

US 2009/0276109 A1 Nov. 5, 2009

Related U.S. Application Data

(60) Provisional application No. 61/050,427, filed on May 5, 2008, provisional application No. 61/153,367, filed on Feb. 18, 2009.

(51) Int. Cl.
*G06F 7/00* (2006.01)
(52) U.S. Cl. ............... 701/36; 701/37; 701/54
(58) Field of Classification Search .......... 701/36, 701/37, 54
See application file for complete search history.

(56) References Cited

U.S. PATENT DOCUMENTS

| | | | |
|---|---|---|---|
| 5,057,728 A | 10/1991 | Dammeyer et al. | |
| 5,509,509 A | 4/1996 | Dammeyer et al. | |
| 5,586,620 A | 12/1996 | Dammeyer et al. | |
| 5,995,001 A | 11/1999 | Wellman et al. | |
| 6,173,226 B1* | 1/2001 | Yoshida et al. | 701/51 |
| 6,236,927 B1 | 5/2001 | Sherman | |
| 6,782,961 B1 | 8/2004 | Ishikawa et al. | |
| 6,810,317 B2 | 10/2004 | Sauter et al. | |
| 7,165,819 B2* | 1/2007 | Yokoyama | 303/151 |
| 7,254,472 B2* | 8/2007 | Larsen et al. | 701/54 |
| 7,634,344 B2 | 12/2009 | Masuda et al. | |
| 7,681,963 B2* | 3/2010 | Sherman et al. | 303/189 |
| 7,873,459 B2* | 1/2011 | Fodor et al. | 701/74 |
| 2002/0099490 A1* | 7/2002 | Wakamatsu et al. | 701/90 |
| 2003/0010559 A1 | 1/2003 | Suzuki | |
| 2006/0178797 A1* | 8/2006 | Larsen et al. | 701/54 |
| 2008/0319609 A1* | 12/2008 | Poilbout | 701/38 |
| 2009/0026984 A1 | 1/2009 | Nakamura et al. | |

(Continued)

FOREIGN PATENT DOCUMENTS

DE 43 44 634 A1 7/1995

(Continued)

OTHER PUBLICATIONS

U.S. Appl. No. 12/432,069, filed Apr. 29, 2009 entitled, "Slip Control for a Materials Handling Vehicle".

(Continued)

*Primary Examiner* — Toan To
(74) *Attorney, Agent, or Firm* — Stevens & Showalter LLP (57) ABSTRACT

A vehicle is provided comprising: a main body; a plurality of wheels coupled to the main body; a traction motor associated with the main body and coupled to at least one of the wheels for driving the one wheel; control apparatus coupled to the traction motor and generating a motor drive signal to the traction motor; and a first sensor for generating a speed signal indicative of a speed of the driven wheel. The control apparatus may calculate acceleration of the one wheel using changes in the speed signal over time and calculate an acceleration of the vehicle using torque applied by the traction motor and a mass of the vehicle.

17 Claims, 7 Drawing Sheets

U.S. PATENT DOCUMENTS

2009/0055047 A1* 2/2009 Poilbout .................. 701/37
2010/0114415 A1 5/2010 Arnsby

FOREIGN PATENT DOCUMENTS

| | | |
|---|---|---|
| DE | 196 37 467 A1 | 4/1997 |
| EP | 1 093 986 A2 | 4/2001 |
| EP | 1 225 078 A2 | 7/2002 |
| EP | 1666301 A1 | 6/2006 |
| EP | 1 764 254 A1 | 3/2007 |
| EP | 1 905 637 A1 | 4/2008 |
| EP | 2172359 A1 | 4/2010 |
| GB | 2 293 148 A | 3/1996 |

OTHER PUBLICATIONS

Massimo Colonna; International Search Report and Written Opinion of the International Searching Authority; International Application No. PCT/US2009/042053; Jul. 17, 2009; European Patent Office.

Massimo Colonna; International Search Report and Written Opinion of the International Searching Authority; International Application No. PCT/US2009/042062; Jul. 17, 2009; European Patent Office.

Pipala, Edward J.; Non-final Office Action in U.S. Appl. No. 12/432,069; Oct. 6, 2011; U.S. Patent and Trademark Office; Alexandria, VA.

* cited by examiner

SLIP CONTROL FOR A MATERIALS HANDLING VEHICLE

RELATED APPLICATIONS

This application claims the benefit of: U.S. Provisional Application No. 61/050,427, filed May 5, 2008 and entitled "SLIP CONTROL FOR A MATERIALS HANDLING VEHICLE"; and U.S. Provisional Application No. 61/153,367, filed Feb. 18, 2009 and entitled "SLIP CONTROL FOR A MATERIALS HANDLING VEHICLE," the disclosures of which are incorporated herein by reference.

FIELD OF THE INVENTION

The present invention relates to a materials handling vehicle having slip control and, more specifically, to a materials handling vehicle that estimates if unacceptable slip is occurring at a driven wheel based on a comparison of a calculated acceleration of the driven wheel and a calculated acceleration of the vehicle.

BACKGROUND OF THE INVENTION

A fork lift truck is known that comprises a power unit comprising an operator's compartment, a battery compartment, and a motor compartment. A battery in the battery compartment supplies power to a traction motor, which is located in the motor compartment and connected to a "driven wheel". If the driven wheel "slips" during operation of the truck, drive efficiency is reduced and excessive wear of the driven wheel occurs.

SUMMARY OF THE INVENTION

In accordance with a first aspect of the present invention, a vehicle is provided comprising: a main body; a plurality of wheels coupled to the main body; a traction motor associated with the main body and coupled to at least one of the wheels for driving the one wheel; a motor controller coupled to the traction motor; a vehicle controller for generating a desired traction control signal to the motor controller; and a first sensor for generating a speed signal indicative of a speed of the driven wheel. The motor controller generates a motor drive signal to the traction motor corresponding to the desired traction control signal. The vehicle controller may calculate an acceleration of the one wheel using changes in the speed signal over time, calculate an acceleration of the vehicle using torque applied by the traction motor and a mass of the vehicle and further estimate if unacceptable slip is occurring at the driven wheel based on a comparison of the calculated acceleration of the wheel and the calculated acceleration of the vehicle.

The vehicle controller may calculate a value corresponding to vehicle roll resistance, wherein vehicle roll resistance comprises air resistance, tire deformation, and bearing and gear drag. The vehicle controller may use the vehicle roll resistance along with the torque applied by the traction motor and the mass of the vehicle when calculating the acceleration of the vehicle.

The vehicle may further comprise forks for carrying a load.

The vehicle may further comprise a second sensor for generating a signal indicative of the mass of a load on the forks to the vehicle controller. The vehicle controller may use the second sensor signal along with the torque applied by the traction motor, the mass of the vehicle and the vehicle roll resistance, when calculating the acceleration of the vehicle.

The vehicle may further comprise a friction brake. The controller may be capable of generating a command signal to the friction brake to generate a torque to brake the driven wheel. The controller may calculate the acceleration of the vehicle using the torque applied by the traction motor, the mass of the vehicle, the vehicle roll resistance, and the torque applied to the vehicle by the friction brake.

The first sensor may be coupled to the traction motor, sense the speed of the traction motor and generate the speed signal. The speed signal preferably corresponds to the speed of the traction motor and is indicative of the speed of the driven wheel.

The first sensor may be further coupled to the motor controller for generating the speed signal to the motor controller. The motor controller may generate a corresponding speed signal to the vehicle controller which calculates the speed of the driven wheel from the corresponding speed signal.

The traction control signal generated by the vehicle controller may define a desired torque to be applied by the traction motor. The vehicle controller may use the desired torque when calculating the acceleration of the vehicle.

The motor controller may estimate torque applied by the traction motor to the driven wheel and generate a corresponding estimated torque signal to the vehicle controller. The vehicle controller may use the estimated torque signal to determine the torque applied by the traction motor when calculating the acceleration of the vehicle.

The vehicle controller may reduce the desired traction control signal to the motor controller if the vehicle controller determines that unacceptable slip is occurring at the driven wheel based on the comparison of the calculated acceleration of the one driven wheel and the calculated acceleration of the vehicle.

Preferably, the vehicle controller reduces the desired traction control signal at a predefined rate until the calculated acceleration of the one driven wheel is no longer increasing in magnitude.

Preferably, the vehicle controller maintains the desired traction control signal at a constant value after the vehicle controller determines that the calculated acceleration of the one driven wheel is no longer increasing in magnitude.

The vehicle controller is allowed to increase the desired traction control signal in magnitude if the vehicle controller determines that unacceptable slip is not occurring at the driven wheel.

The vehicle controller preferably determines that unacceptable slip is occurring at the driven wheel if the following Conditions I and II are met: Condition I) the calculated acceleration magnitude of the one driven wheel is greater than either of value (1) or value (2) and; Condition II) based on calculations, both the driven wheel and the vehicle are being positively accelerated or both the driven wheel and the vehicle are being negatively accelerated, i.e., the driven wheel does not have a calculated positive acceleration while the vehicle has a calculated negative acceleration or the driven wheel does not have a calculated negative acceleration while the vehicle has a calculated positive acceleration. Value (1) and value (2) are calculated from the following equations:

$$((\text{the calculated acceleration magnitude of the vehicle}) \times A) + B = \text{value (1)}$$

$$(\text{the calculated acceleration magnitude of the vehicle}) + C = \text{value (2)}$$

wherein A, B and C are constants.

If either condition I or condition II is not met or both conditions I and II are not met, then the vehicle controller presumes that slip is acceptable or no slip is occurring.

In accordance with a second aspect of the present invention, a vehicle is provided comprising: a main body; a plurality of wheels coupled to the main body; a traction motor associated with the main body and coupled to at least one of the wheels for driving the one wheel; control apparatus coupled to the traction motor and generating a motor drive signal to the traction motor; and a first sensor for generating a speed signal indicative of a speed of the driven wheel. The control apparatus may calculate acceleration of the one wheel using changes in the speed signal over time and estimate an acceleration of the vehicle using forces acting on the vehicle and a mass of the vehicle.

The control apparatus may further estimate if unacceptable slip is occurring at the driven wheel based on a comparison of the calculated acceleration of the wheel and the calculated acceleration of the vehicle.

The control apparatus may calculate a value corresponding to vehicle roll resistance. Preferably, the control apparatus uses the vehicle roll resistance along with the torque applied by the traction motor when determining the forces acting on the vehicle.

DETAILED DESCRIPTION OF THE INVENTION

Figure 1:
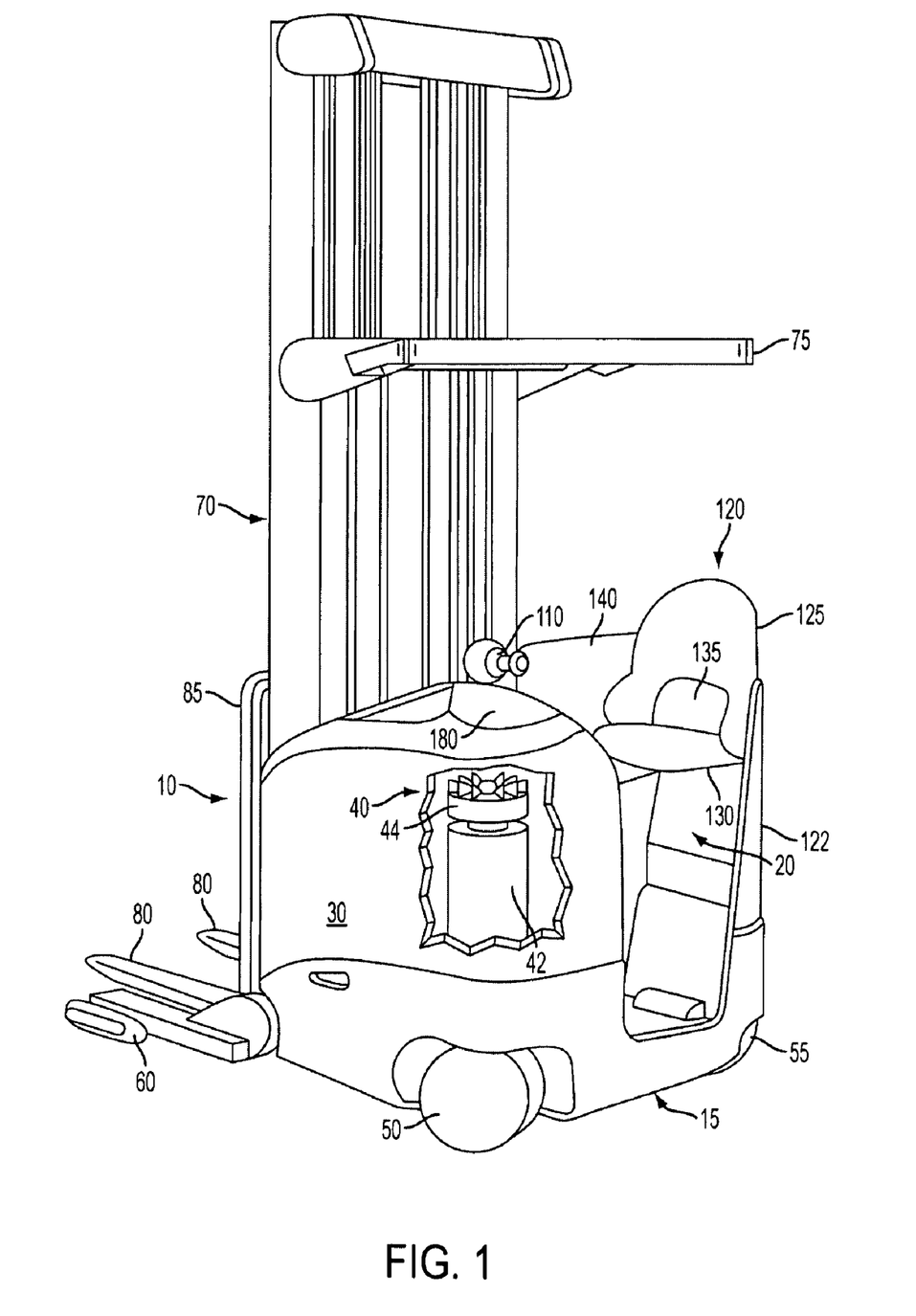
FIG. 1 is a perspective view of a vehicle constructed in accordance with the present invention with a portion of the main body removed.
Figure 2:
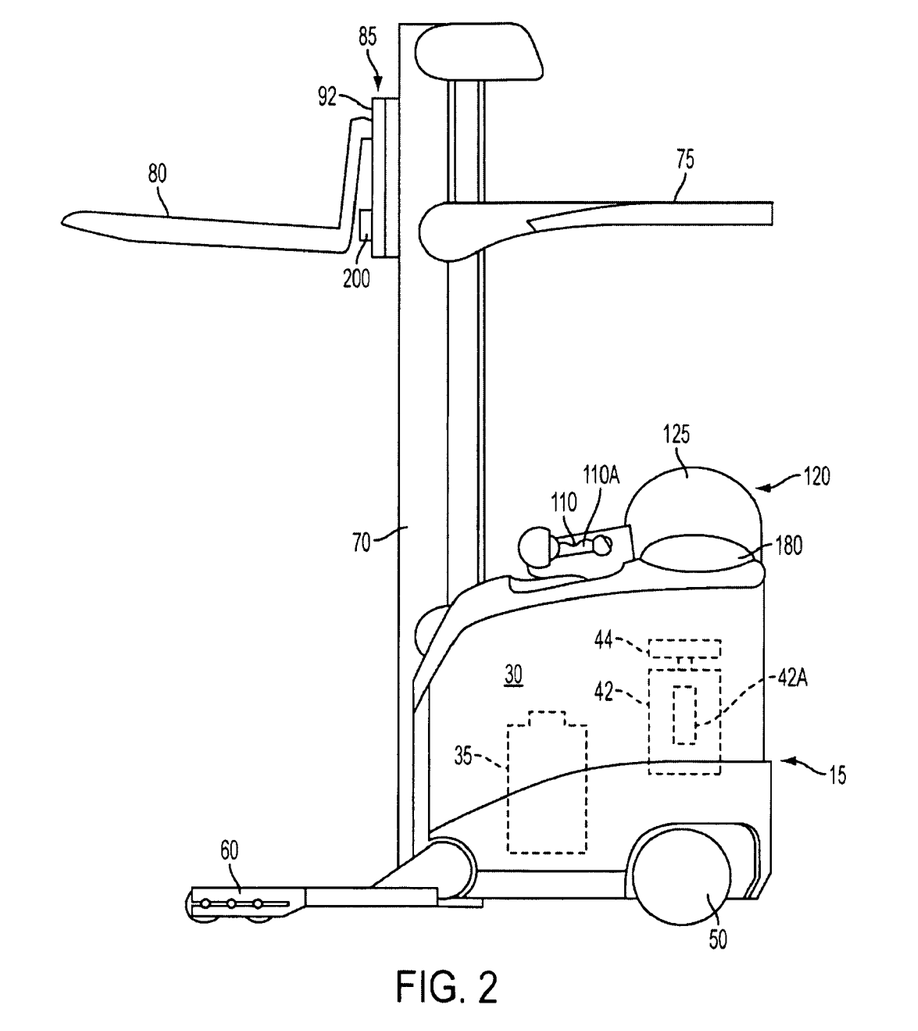
FIG. 2 is a side view of the vehicle illustrated in FIG. 1.
Figure 3:
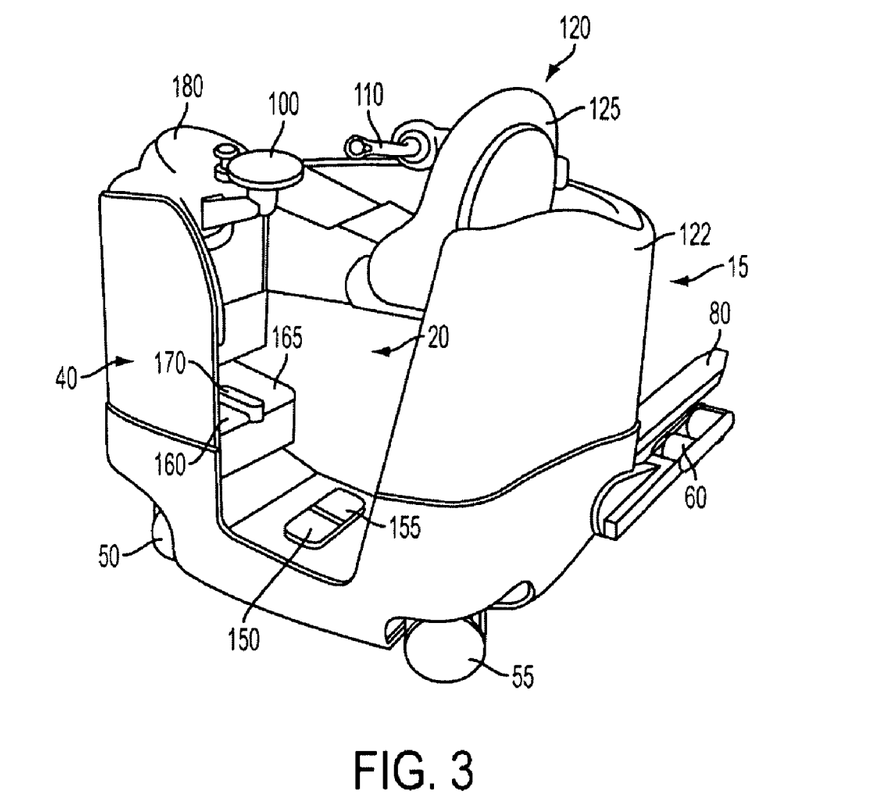
FIG. 3 is a perspective view of an operator's compartment in the main body of the truck illustrated in FIG. 1.

FIGS. 1-3 show a rider reach fork lift truck or vehicle 10 that includes a power unit or main body 15 comprising an operator's compartment 20, a battery compartment 30, and a motor compartment 40. A battery 35, see FIG. 2, in the battery compartment 30 supplies power to a traction motor 42, which is located in the motor compartment 40 and connected to a steerable wheel 50 (also referred to herein as a "driven wheel") located at the left rear corner of the main body 15. Attached to the traction motor 42 is a service or friction brake 44 for applying a braking torque to a drive shaft of the traction motor 42 to effect braking of the motor 42 and the driven wheel 50.

The brake 44 may comprise a variable braking force electric brake comprising two sets of springs (not shown) for urging a non-magnetic brake support plate (not shown) and associated brake pads (not shown) against a rotor (not shown). Three levels of braking force may be provided with brake release and level of braking force being controlled via electromagnetic elements. The amount of braking torque applied by the service brake 44 may comprise a constant first torque amount, a constant second torque amount greater than the first torque amount or a constant third torque amount greater than the first or the second torque amount. A similar type of friction brake is described in U.S. Pat. No. 5,057,728, the entirety of which is incorporated by reference herein. U.S. Pat. No. 5,509,509 is also incorporated in its entirety herein. A roller bearing encoder 42A (also referred to herein as a "first sensor") is incorporated into the motor 42 for sensing the speed and direction of rotation of the traction motor 42, see FIGS. 2 and 4. The speed signal generated by the encoder 42A is indicative of the speed of rotation of the driven wheel 50. A caster wheel 55 is mounted at the right rear corner of the power unit 15. A pair of outriggers 60 support the front end of the truck 10.

Figure 4:
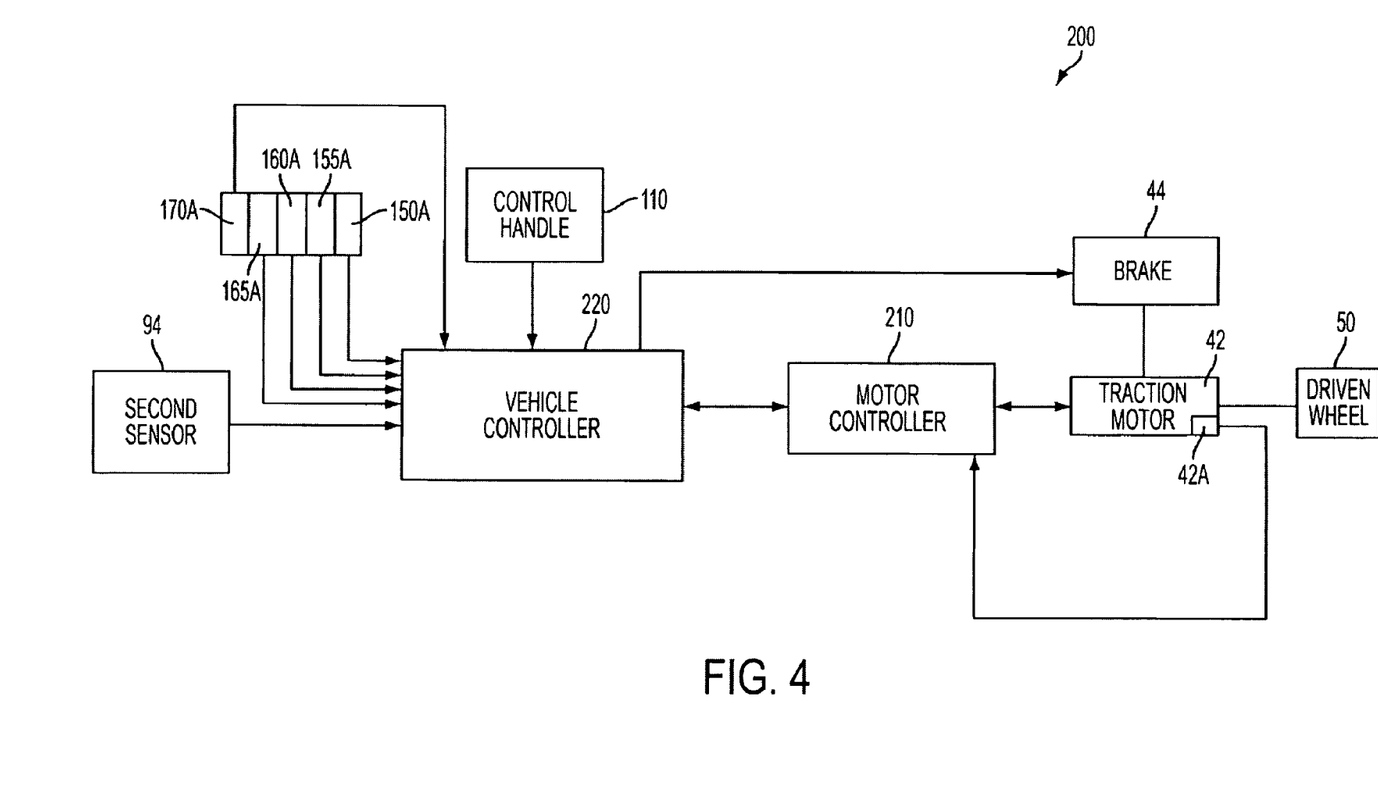
FIG. 4 is a block diagram of a control apparatus forming part of the vehicle illustrated in FIG. 1.

A mast assembly 70, mounted to the front of the main body 15 of the truck 10, supports an overhead guard 75. A pair of forks 80 are carried on a fork carriage mechanism 85 which is coupled to the mast assembly 70. The mast assembly 70 may comprise one or more mast weldments movable relative to a stationary mast weldment, see U.S. Pat. Nos. 5,586,620 and 5,995,001, the entirety of these patents are incorporated by reference herein. One or more hydraulic lift cylinders (not shown) are operated by a control handle 110 to lift the movable mast weldments and the fork carriage mechanism 85 relative to the stationary mast weldment. A pressure sensor 94 (also referred to herein as a "second sensor"), see FIG. 4, is coupled to the one or more hydraulic lift cylinders for sensing the fluid pressure within the cylinders. The pressure sensor 94 generates a signal indicative of the load mass on the forks 80. In addition to a reach mechanism 92 which allows the forks 80 to be extended forward of the mast assembly 70, the fork carriage mechanism 85 may include a side shift mechanism (not shown) to permit the forks 80 to be moved from side to side relative to the mast assembly 70, and a tilt mechanism comprising a hydraulic cylinder 200 located between the forks 80 and the fork carriage 85 to permit the forks 80 to be tilted relative to horizontal.

In the operator's compartment 20 are mounted a steering tiller 100, see FIG. 3, for controlling steering of the truck 10 and the control handle 110 for controlling the speed of travel and the forward and reverse direction of the truck 10 as well as fork height, fork extension, and fork tilt and side-shift.

Also located within the operator's compartment 20 may be a seat assembly 120 which is attached to the right side 122 of the power unit 15, as shown. The seat assembly 120 includes a back rest 125, a seat 130, and a shelf 135. The seat assembly 120 is vertically adjustable for operator comfort. An armrest 140 may be supported on the seat assembly 120 for movement therewith.

On the floor of the operator's compartment 20 are two foot pedals 150 and 155, see FIG. 3. The left-hand pedal 150 operates an electric switch 150A to control braking of the truck 10 while the right-hand pedal 155 operates a switch 155A indicating the presence of the operator's foot thereon. Also located within the operator's compartment are three additional pedals: a pedal 160 which corresponds to the pedal 150 and is coupled to a switch 160A; a pedal 165 which corresponds to the pedal 155 and is coupled to a switch 165A; and, a pedal 170 which is an additional brake pedal coupled to a switch 170A.

The operator must have one foot on and depress the pedal 150 or the pedal 160 in order for the truck 10 to move; otherwise, the truck's brakes will be fully applied. The operator must also depress either pedal 155 or pedal 165 in order for the truck 10 to move, if it is stopped. If the truck 10 is moving, removal of the foot from the pedal 155 or the pedal 165 will cause the truck 10 to coast. The switches 155A and 165A controlled by pedals 155 and 165 are known as "presence" or "cut back" switches. Pedal 170 is an axillary brake switch. Anytime the operator depresses pedal 170, the brakes of the truck 10 will be immediately applied.

An operator's console 180 provides the operator with information regarding the status of the battery voltage and may provide additional information including indications regarding the fork height and the mass of the load on the forks 80.

The truck 10 includes two braking modes. In the first mode, commonly referred as "plugging," movement of the control handle 110 in the direction opposite to the current direction of travel of the truck 10 is recognized as a plugging request and results in braking by action of the traction motor 42. During plugging, power is applied to the traction motor 42 tending to drive the motor 42 in a direction opposite to that in which the truck 10 is moving, although the motor 42 still rotates in the direction of truck movement. Until the truck 10 slows to zero speed, the motor 42 acts as a dynamic brake. Ultimately, the truck 10 slows to a stop and begins to move in the reverse direction, at which time the plugging action ceases. It should be noted that plugging, as herein defined, may utilize the principles of regenerative braking. In the second mode, commonly known as service braking, the operator either removes his/her foot from the pedal 150 or the pedal 160, or depresses the pedal 170. In response to the service brake request, the braking effort is allocated between the service brake 44 and the traction motor 42, wherein use of the traction motor 42 is maximized so as to reduce wear on the service brake 44.

The block diagram of FIG. 4 shows control apparatus 200 located within the main body 15 comprising a motor controller 210 and a vehicle controller 220. The motor controller 210 is coupled to the traction motor 42 and the first sensor 42A. The vehicle controller 220 is coupled to the motor controller 210, the friction brake 44, the second sensor 94, the control handle 110 and the switches 150A, 155A, 160A, 165A and 170A.

As noted above, an operator can control the speed of travel and the forward and reverse direction of the truck 10 via the control handle 110. As also noted above, an operator can generate a plugging command via the control handle 110.

When an operator wishes to command movement of the truck 10 in a forward direction, i.e., a forks first direction, the operator pushes the control handle 110 in a forward direction, i.e., away from the operator, wherein the amount of movement of the handle 110 corresponds to an amount of positive torque to be applied to the driven wheel 50 so as to increase the truck's speed in the forks first direction. If the operator wishes to command movement of the truck 10 in a reverse direction, i.e., in a power unit first direction, the operator pulls the control handle 110 in a reverse direction, i.e., towards the operator, wherein the amount of movement of the control handle 110 corresponds to an amount of negative torque to be applied to the driven wheel 50 so as to increase the truck's speed (magnitude) in the power unit first direction. Based on the direction and amount of movement of the control handle 110, the control handle 110 generates a direction and magnitude signal to the vehicle controller 220.

If the truck 10 is moving in the forward or forks first direction and the operator wishes to effect braking via a plugging operation, i.e., via action of the traction motor 42, the control handle 110 is moved in the reverse direction toward the operator, wherein the amount of movement of the control handle 110 corresponds to an amount of negative torque to be applied to the driven wheel 50 to brake the truck 10. If the truck 10 is moving in the reverse or power unit first direction and the operator wishes to effect braking via a plugging operation, i.e., via action of the traction motor 42, the control handle 110 is moved in a forward direction away from the operator, wherein the amount of movement of the control handle 110 corresponds to a desired positive torque to be applied to the driven wheel 50 to brake the truck 10. Again, based on the direction and amount of movement of the control handle 110, the control handle 110 generates a direction and magnitude signal to the vehicle controller 220.

If the truck 10 is moving and the operator either releases pedal 150 (or pedal 160 if pedal 160 is being used) or the operator depresses brake pedal 170, a braking signal is generated to the vehicle controller 220 by a corresponding switch 150A, switch 160A or switch 170A. As noted above, the vehicle controller 220 maximizes use of the traction motor 42 to effect dynamic braking so as to minimize use of the service brake 44. See U.S. Pat. No. 6,236,927, the entire disclosure of which is incorporated herein by reference.

Based on signals from the control handle 110, the switches 150A, 155A, 160A, 165A and 170A, the second sensor 94 and a speed signal from the motor controller 210, the vehicle controller 220 generates a desired traction control signal to the motor controller 210. In response to receiving the traction control signal from the vehicle controller 220, the motor controller 210 generates a motor drive signal to the traction motor 42 corresponding to a desired positive or negative torque to be applied to the driven wheel 50. A positive torque applied to the driven wheel 50 is intended to effect a force on the truck 10 in a forks first direction to either increase the speed of the truck 10 in the forks first direction or to brake the truck 10 when moving in the power unit first direction. A negative torque applied to the driven wheel 50 is intended to effect a force on the truck 10 in a power unit first direction to either increase the speed of the truck 10 in the power unit first direction or to brake the truck 10 when moving in the forks first direction.

In the illustrated embodiment, the desired traction control signal generated by the vehicle controller 220 comprises a desired torque control signal corresponding to a desired torque, either positive or negative, to be applied by the traction motor 42 to the driven wheel 50. It is contemplated that the desired traction control signal generated by the vehicle controller 220 may comprise a desired speed control signal commanding the motor controller 210 to generating a motor drive signal to the traction motor 210 to drive the driven wheel 50 at a desired speed.

As noted above, when an operator wishes to command movement of the truck 10 in a forward direction, i.e., a forks first direction, the operator pushes the control handle 110 in the forward direction a desired amount. Further, the operator must have already depressed either the pedal 155 or the pedal 165, indicating that the operator is present in the operator's compartment 20, and either pedal 150 or 160, to deactivate service braking. In response, the vehicle controller 220 generates an appropriate traction control signal to the motor controller 210 to generate a desired positive torque to the driven wheel. As also noted above, when an operator wishes to command movement of the truck 10 in a reverse direction, i.e., in a power unit first direction, the operator pulls the control handle 110 in the reverse direction a desired amount. Further, the operator must have already depressed either the pedal 155 or the pedal 165, indicating that the operator is present in the operator's compartment 20, and either the pedal 150 or the pedal 160, to deactivate braking. In response, the vehicle controller 220 generates an appropriate traction control signal to the motor controller 210 corresponding to a desired negative torque to the driven wheel 50.

If the truck 10 is moving in either the forward or the reverse direction and the operator wishes to effect braking via a plugging operation, i.e., via action of the traction motor 42, the control handle 110 is moved in a direction opposite to the vehicle travel direction an amount corresponding to a desired braking torque to be applied to the driven wheel 50 to brake the truck 10. In response, the vehicle controller 220 generates an appropriate traction control signal to the motor controller 210 corresponding to a desired braking torque to be applied to effect plugging braking.

If the truck 10 is moving and the operator either releases the pedal 150 or the pedal 160 or the operator depresses the brake pedal 170, a corresponding service braking signal is generated to the vehicle controller 220 by a corresponding one of switch 150A, switch 160A and switch 170A. In response, the vehicle controller 220 determines the total braking torque required to brake the vehicle 10, subtracts the maximum braking torque capacity of the traction motor 42 from the total braking torque to determine a minimum amount of braking torque to be applied by the service brake 44. The braking torque to be applied by the service brake 44 is selected from one of the first, second and third torque amounts noted above, wherein the selected torque amount is equal to or greater than the service brake braking torque amount determined when subtracting the maximum braking torque capacity of the traction motor 42 from the total braking torque required to brake the truck 10. The vehicle controller 220 then generates an appropriate control signal to the service brake 44 instructing the service brake 44 to apply the selected level of mechanical braking torque and further generates an appropriate traction control signal to the motor controller 210 to generate a traction motor braking torque by the traction motor 42, which traction motor braking torque is equal to the total braking torque required to brake the truck 10 minus the selected braking torque of the service brake 44.

Slip or relative motion may occur between the driven wheel 50 and a supporting surface, e.g., a floor. A "percent slip" may be define as a ratio of a difference between a peripheral speed $S_{PER}$ of the driven wheel 50 and the truck's speed (ground speed) $S_G$ relative to the truck's speed (ground speed) $S_G$.

% Slip=$(S_{PER}-S_G)/S_G$

It is believed that a maximum tractive force of a tire on hard surfaces is usually reached between about 15% and 20% slip.

Figure 7:
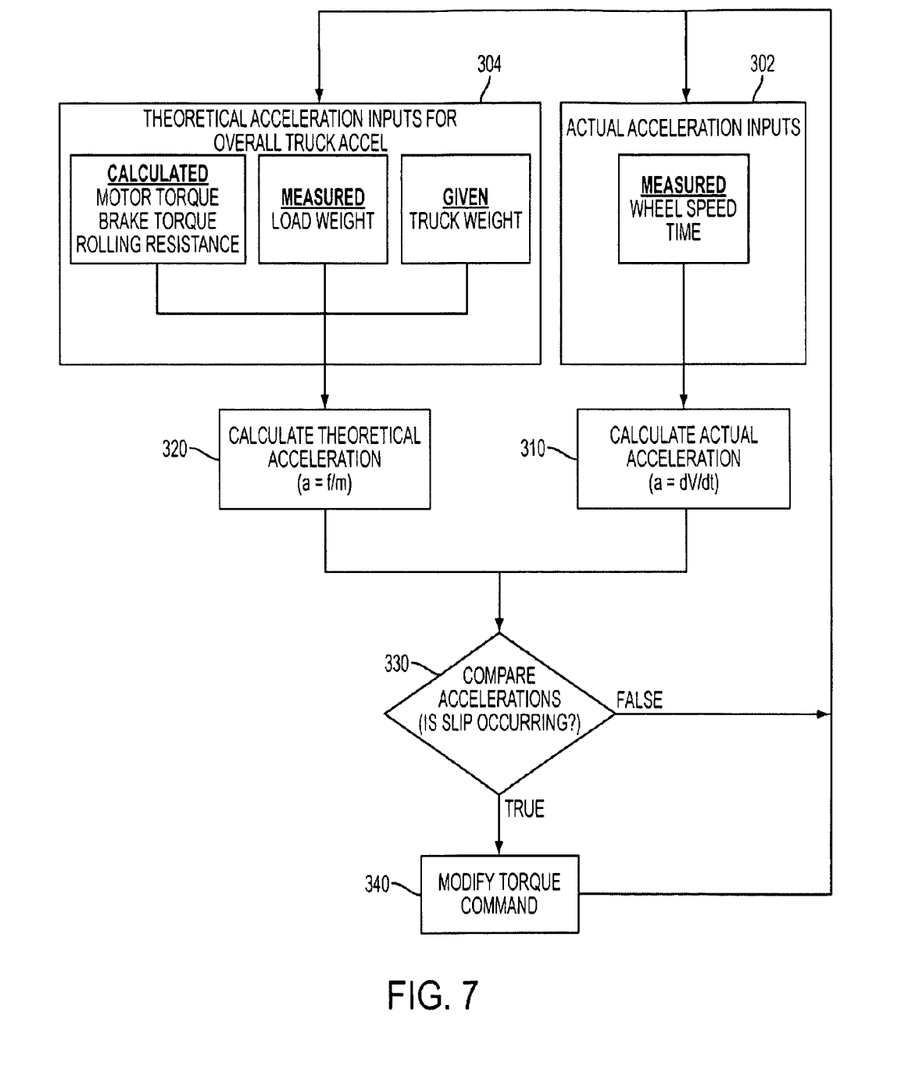
FIG. 7 illustrates steps performed by the vehicle illustrated in FIG. 1.

In accordance with the present invention, the vehicle controller 220 calculates actual linear acceleration of the driven wheel 50, see step 310 in FIG. 7, calculates theoretical linear acceleration of the overall truck 10, see step 320 in FIG. 7, compares the calculated acceleration of the driven wheel 50 to the calculated acceleration of the truck 10, see step 330 in FIG. 7. Based on that comparison, a determination is made as to whether unacceptable slip is occurring between the driven wheel 50 and the supporting surface. Acceleration of the driven wheel 50 in the forks first direction so as to increase the speed of the driven wheel 50 is considered to be positive acceleration; acceleration of the driven wheel 50 in the power unit first direction so as to increase the speed of the driven wheel 50 is considered to be negative acceleration; acceleration of the driven wheel 50 so as to decrease the speed of the driven wheel 50 when the truck 10 is moving in the forks first direction is considered to be negative acceleration; and acceleration of the driven wheel 50 so as to decrease the speed of the driven wheel 50 when the truck 10 is moving in the power unit first direction is considered to be positive acceleration. Acceleration of the truck 10 in the forks first direction so as to increase the speed of the truck 10 is considered to be positive acceleration; acceleration of the truck 10 in the power unit first direction so as to increase the speed of the truck 10 is considered to be negative acceleration; acceleration of the truck 10 when the truck 10 is moving in the forks first direction so as to decrease the speed of the truck 10 is considered to be negative acceleration; and acceleration of the truck 10 so as to decrease the speed of the truck 10 when the truck 10 is moving in the power unit first direction is considered to be positive acceleration.

Because the acceleration of the overall truck is estimated or calculated in the illustrated embodiment, a separate sensor for measuring overall truck velocity, i.e., ground speed, or overall truck acceleration is not required, which provides a cost savings benefit.

Figure 5:
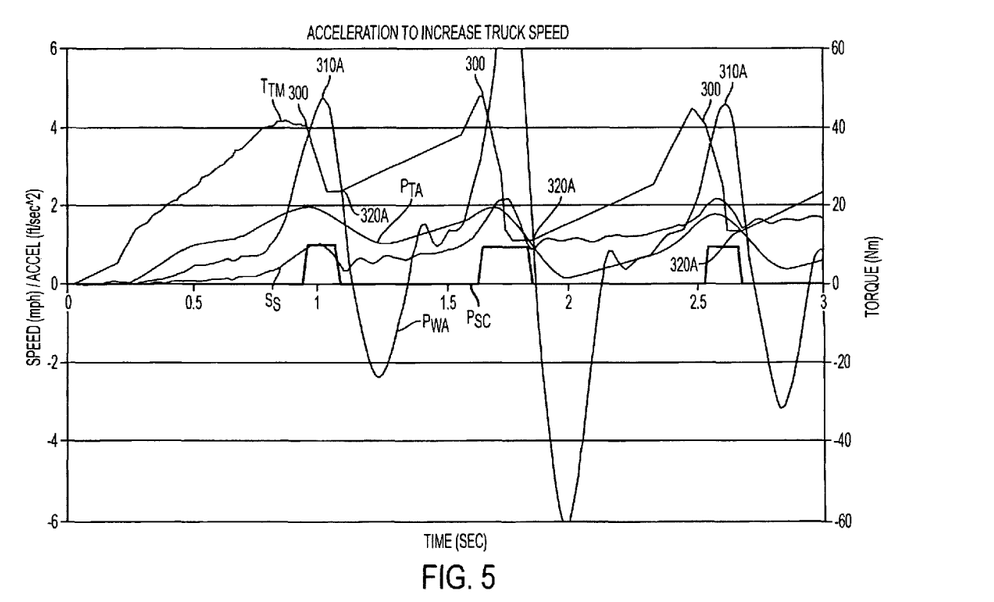
FIG. 5 illustrates example data plots corresponding to a vehicle being positively accelerated in a forks first direction.
Figure 6:
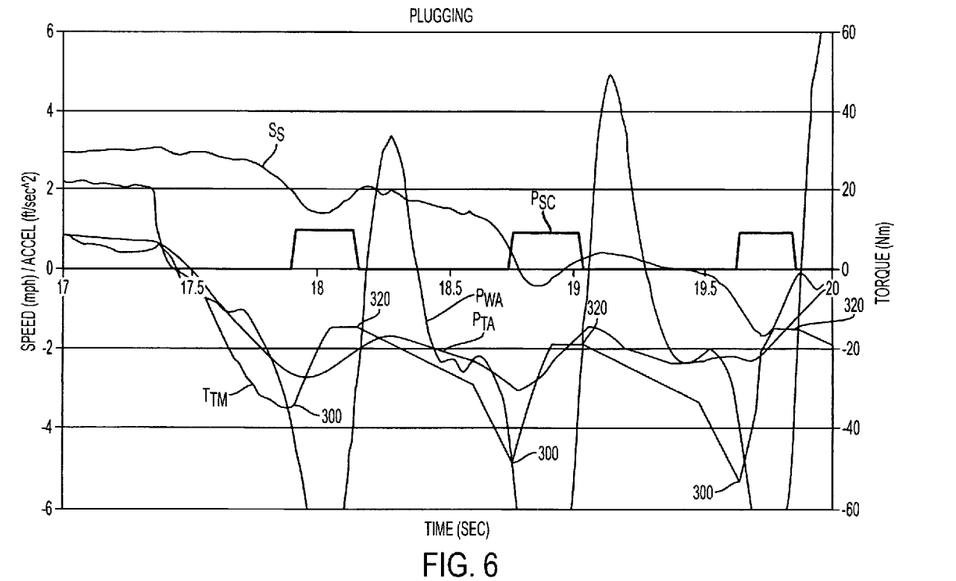
FIG. 6 illustrates example data plots corresponding to a vehicle being operated in the forks first direction and braked.

Acceleration of the driven wheel 50 is calculated using changes in the speed signal generated by the encoder 42A over time, i.e., $\Delta V/\Delta t$, see steps 302 and 310 in FIG. 7. Example speed signals $S_S$ are illustrated in FIGS. 5 and 6. In the illustrated embodiment, the speed signal is generated by the encoder 42A to the motor controller 210, which, in turn, generates a corresponding speed signal to the vehicle controller 220. It is contemplated that the speed signal could be provided by the encoder 42A directly to the vehicle controller 220.

In the illustrated embodiment, the vehicle controller 220 samples the speed signal every predefined time period or "tick." These samples are cascaded into a memory in the vehicle controller 220 until a total of a predetermined number of samples are stored in the memory. Accordingly, samples are stored in the memory representing driven wheel speed in predefined time period intervals for a total of a predetermined number of such samples. If the predetermined number of memory locations are full, the oldest sample is replaced with a new speed signal sample. The calculated driven wheel acceleration is calculated from the samples stored in the memory by using a conventional linear regression equation to establish a least squares fit of the samples of the driven wheel speed stored in the memory plotted against time. Accordingly, a linear plot of driven wheel speed against time is achieved. Driven wheel acceleration, including whether the acceleration is positive or negative, is calculated by calculating the slope of the line generated by the linear regression, i.e., $\Delta V/\Delta t$. Example plots $P_{WA}$ of driven wheel acceleration are shown in FIGS. 5 and 6.

Acceleration of the truck 10 is calculated from the following information: torque applied by the traction motor 42 to the driven wheel 50, the mass of the truck 10, the mass of any load on the forks 80, truck roll resistance, and braking torque applied by the friction brake 44, see steps 304 and 320 in FIG. 7. As noted above, the traction control signal generated by the vehicle controller 220 may define a desired torque to be applied by the traction motor 42 to the driven wheel 50. The vehicle controller 220 may use the traction control signal defining a desired torque when estimating the acceleration of the truck 10. In accordance with a further embodiment of the present invention, the motor controller 210 may estimate torque applied by the traction motor 42 to the driven wheel 50 and generate a corresponding estimated torque signal to the vehicle controller 220. The vehicle controller 220 may use the estimated torque signal from the motor controller 210 to determine the torque applied by the traction motor 42 when calculating the acceleration of the truck 10. It is further contemplated that torque applied by the traction motor 42 may be measured via a sensor (not shown), wherein a signal corresponding to the measured torque may be provided by the sensor to the vehicle controller 220 for use by the vehicle controller 220 when calculating the acceleration of the truck 10.

The mass of the truck 10 is a fixed value stored in memory in the vehicle controller 220. The vehicle roll resistance corresponds to air resistance, tire deformation and bearing and gear drag. In the illustrated embodiment, the vehicle roll resistance is calculated by the vehicle controller 220 to be equal to 2% of the summation of the fork load mass and the mass of the truck 10. The vehicle controller 220 can determine the mass of any load on the forks 80 from readings taken from the signal generated by the pressure sensor 94. The vehicle controller 220 knows the amount of torque applied by the service brake 44 to the traction motor drive shaft, and, hence, the driven wheel 50, wherein the torque applied equals zero torque (no service braking being commanded) or one of first, second and third constant service brake torque amounts (when service braking is being commanded).

As noted above, acceleration of the overall truck 10 is calculated from the following information: torque applied by the traction motor 42 to the driven wheel 50, the mass of the truck 10, the mass of any load on the forks 80, truck roll resistance, and braking torque applied by the friction brake 44, see steps 304 and 320 in FIG. 7. More specifically, the vehicle controller 220 determines a total force, including whether the total force is positive or negative, acting on the truck 10 based on the torque, either positive (to apply a force in the forks first direction) or negative (to apply a force in the power unit first direction), applied by the traction motor 42 to the driven wheel 50, truck roll resistance (negative when the truck 10 is moving in the forks first direction and positive when the truck 10 is moving in the power unit first direction), and braking torque applied by the friction brake 44 (positive when the truck 10 is moving in the power unit first direction and negative when the truck 10 is moving in the forks first direction), see steps 304 and 320 in FIG. 7. In the illustrated embodiment, the vehicle controller 220 determines total force every predefined time period. Values of total force are cascaded into a memory in the vehicle controller 220 until a predetermined number of values are stored in the memory. If the predetermined number of memory locations are full, the oldest total force value is replaced with a new total force value. Every predefined time period, the vehicle controller 220 determines an average of the total force from the predetermined number of values stored in the memory, divides the average total force by a summation of the truck mass and fork load mass, and determines a calculated acceleration for the overall truck 10, including whether the truck acceleration is positive or negative:

Acceleration=Force/mass.

The calculated acceleration of the truck 10 may differ from the calculated acceleration of the driven wheel 50 due to slip. Example plots $P_{TA}$ of calculated truck acceleration are shown in FIGS. 5 and 6.

In the illustrated embodiment, the vehicle controller 220 does not calculate a percent slip value. Instead, the vehicle controller 220 uses values (1) and (2), set out below, to compare the calculated driven wheel acceleration with the calculated overall truck acceleration to determine if unacceptable slip is occurring at the driven wheel 50. More specifically, the vehicle controller 220 determines that slip is unacceptable at the driven wheel 50 if the following Conditions I and II are met: Condition I) the calculated acceleration magnitude (i.e., absolute value) of the driven wheel 50 is greater than either of value (1) or value (2) and; Condition II) based on calculations, both the driven wheel 50 and the truck 10 are being positively accelerated or both the driven wheel 50 and the truck 10 are being negatively accelerated. Condition II is not met if the driven wheel has a calculated positive acceleration while the truck has a calculated negative acceleration or the driven wheel has a calculated negative acceleration while the truck has a calculated positive acceleration. Values (1) and (2) are calculated from the following:

$$((\text{the estimated acceleration magnitude of the truck}) \times A) + B = \text{value (1)}$$

$$(\text{the estimated acceleration magnitude of the truck}) + C = \text{value (2)}$$

wherein A, B and C are constants.

In the examples illustrated in FIGS. 5 and 6, A=1.25, B=1 and C=2. Constants A, B and C may be defined so that when the calculated acceleration magnitude of the driven wheel 50 is greater than at least one of a value (1) or value (2), percent slip is unacceptable, i.e., greater than about 20% slip.

If either condition I or condition II is not met or both conditions I and II are not met, then the vehicle controller determines that slip is acceptable or no slip is occurring.

In FIGS. 5 and 6, the following example data plots are provided: plots of the speed signal $S_S$ generated by the encoder 42A; plots $P_{WA}$ of calculated driven wheel acceleration; plots $P_{TA}$ of calculated truck acceleration; and plots $T_{TM}$ of traction motor torque. The data plots set out in FIG. 5 correspond to the truck 10 being positively accelerated (positive torque being applied) in the forks first direction so as to increase its speed. The data plots set out in FIG. 6 correspond to the truck 10 being driven in the forks first direction and being braked (negative torque being applied) via a plugging braking operation.

Further provided in FIGS. 5 and 6 are slip vs. time plots $P_{SC}$. When slip is equal to 1, the calculated acceleration magnitude of the driven wheel 50 is greater than at least one of value (1) or value (2) and Condition II set out above is met. Hence, slip at the driven wheel 50 is presumed to be unacceptable. If the vehicle controller 220 determines that slip is unacceptable, it reduces the value of the desired traction control signal to the motor controller 210 so as to reduce the torque (magnitude) applied by the traction motor 42 to the driven wheel 50. In FIGS. 5 and 6, torque (magnitude) begins to be reduced at points 300.

In the illustrated embodiment, the vehicle controller 220 reduces the desired traction control signal in magnitude at a predefined rate until the calculated acceleration of the one driven wheel 50 is no longer increasing in magnitude, see points 310A in FIG. 5. More specifically, the traction control signal magnitude is reduced every predefined time period by multiplying the previous traction control signal value by 0.9. The traction control signal is reduced in this manner until the calculated acceleration of the one driven wheel 50 is no longer increasing in magnitude. The vehicle controller 220 maintains the desired traction control signal at a constant value after the vehicle controller 220 determines that the calculated acceleration of the driven wheel 50 is no longer increasing in magnitude. This constant value is maintained until slip is determined to be acceptable.

As noted above, the vehicle controller 220 presumes that slip is acceptable or no slip is occurring if condition I is not met, condition II is not met or both conditions I and II are not met. The vehicle controller 220 increases the desired traction control signal in magnitude if the vehicle controller 220 determines that unacceptable slip is not occurring, i.e., slip is acceptable or no slip is occurring, at the driven wheel 50, see points 320A in FIGS. 5 and 6 where the magnitude of torque generated by the traction motor 42 begins to increase. In the illustrated embodiment, the torque is increased in magnitude during positive acceleration by 0.5 Nm every predefined time period for a total of a predetermined number of time intervals.

After the predetermined number of time intervals, torque is increased in magnitude at a normal rate. Further in the illustrated embodiment, the torque is increased in magnitude during braking by 0.5 Nm every predefined time period for a total of a predetermined number of time intervals. After the predetermined number of time intervals, torque is increased in magnitude at a normal rate.

While the present invention has been described in the illustrated embodiment as forming part of a rider reach fork lift truck or vehicle, it is contemplated that the present invention may be incorporated into any vehicle comprising a traction motor for driving a wheel of the vehicle, and a speed sensor generating a signal indicative of a speed of the driven wheel. For example, any materials handling vehicle may, in accordance with the present invention, comprise a traction motor, a speed sensor for generating a speed signal indicative of a speed of a driven wheel and control apparatus for calculating acceleration of the driven wheel using changes in the speed signal over time and calculating an acceleration of the vehicle using torque applied by the traction motor and a mass of the vehicle. The control apparatus may further estimate if unacceptable slip is occurring at the driven wheel based on a comparison of the calculated acceleration of the wheel and the calculated acceleration of the vehicle. It is further contemplated that the present invention may be incorporated into a materials handling vehicle, such as sit-down counterbalanced forklift truck, where braking is controlled via a pedal capable of being depressed to activate braking, vehicle acceleration to increase vehicle speed is activated via an accelerator pedal and plugging is controlled via a wand on a steer column or a rocker or toggle switch on a cowl panel.

It is further contemplated that a vehicle constructed in accordance with the present invention may include two or more traction motors. For example, a vehicle may comprise a first traction motor for driving a first wheel, a first speed sensor for generating a first speed signal indicative of a speed of the first driven wheel, a second traction motor for driving a second wheel, a second speed sensor for generating a second speed signal indicative of a speed of the second driven wheel, and control apparatus for calculating acceleration of each of the first and second driven wheels using changes in the first and second speed signals over time and calculating an acceleration of the vehicle using forces acting on the vehicle such as torque applied by the first and second traction motors, and a mass of the vehicle. The control apparatus may further estimate if unacceptable slip is occurring at the first driven wheel based on a comparison of the calculated acceleration of the first wheel and the calculated acceleration of the vehicle and also estimate if unacceptable slip is occurring at the second driven wheel based on a comparison of the calculated acceleration of the second wheel and the calculated acceleration of the vehicle. In this embodiment, slip may be occurring at one of the first and second driven wheels while not occurring at the other of the first and second driven wheels.

It is still further contemplated that once a control apparatus determines that unacceptable slip is occurring at a driven wheel, the control apparatus may apply and control the torque of a brake, such as a hydraulically or electrically controlled brake associated with the driven wheel, so as to reduce slip. Further, the brake may be applied either alone or concurrently with reducing the value of a traction control signal to a corresponding traction motor driving the driven wheel. When the brake is applied, it may be pulsed so as to reduce slip.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A vehicle comprising:
   a main body;
   a plurality of wheels coupled to said main body;
   a traction motor associated with said main body and coupled to at least one of said wheels for driving said one wheel;
   a motor controller coupled to said traction motor;
   a vehicle controller for generating a desired traction control signal to said motor controller, said motor controller generating a motor drive signal to said traction motor corresponding to said desired traction control signal;
   a first sensor for generating a speed signal indicative of a speed of said driven wheel; and
   said vehicle controller calculating acceleration of said one wheel using changes in said speed signal over time, calculating an acceleration of said vehicle using torque applied by said traction motor and a mass of said vehicle and further estimating if unacceptable slip is occurring at said driven wheel based on a comparison of said calculated acceleration of said wheel and said calculated acceleration of said vehicle.

2. The vehicle as set out in claim 1, wherein said vehicle controller calculates a value corresponding to vehicle roll resistance, said vehicle controller using the vehicle roll resistance along with the torque applied by said traction motor and the mass of the vehicle when calculating the acceleration of said vehicle.

3. The vehicle as set out in claim 2, further comprising forks for carrying a load.

4. The vehicle as set out in claim 3, further comprising a second sensor for generating a signal indicative of the mass of a load on said forks to said vehicle controller, said vehicle controller using the second sensor signal along with the torque applied by said traction motor, the mass of the vehicle and the vehicle roll resistance, when calculating the acceleration of said vehicle.

5. The vehicle as set out in claim 2, further comprising a friction brake and wherein said controller is capable of generating a command signal to said friction brake to generate a torque to brake said driven wheel and said controller calculating the acceleration of said vehicle using the torque applied by said traction motor, the mass of the vehicle, the vehicle roll resistance, and the torque applied to said vehicle by said friction brake.

6. The vehicle as set out in claim 1, wherein said first sensor is coupled to said fraction motor, senses the speed of said traction motor and generates the speed signal, the speed signal corresponding to the speed of said traction motor and being indicative of the speed of said driven wheel.

7. The vehicle as set out in claim 6, wherein said first sensor is further coupled to said motor controller for generating the speed signal to said motor controller, said motor controller generating a corresponding speed signal to said vehicle controller which calculates the speed of said driven wheel from the corresponding speed signal.

8. The vehicle as set out in claim 1, wherein the traction control signal generated by said vehicle controller defines a desired torque to be applied by said traction motor and said vehicle controller uses the desired torque when calculating the acceleration of said vehicle.

9. The vehicle as set out in claim 1, wherein said motor controller estimates torque applied by said traction motor to said driven wheel and generates a corresponding estimated torque signal to said vehicle controller, said vehicle controller using the estimated torque signal to determine the torque applied by said traction motor when calculating the acceleration of said vehicle.

10. The vehicle as set out in claim 1, wherein said vehicle controller reduces the desired traction control signal to said motor controller if said vehicle controller determines that unacceptable slip is occurring at said driven wheel based on the comparison of the calculated acceleration of said one driven wheel and the calculated acceleration of said vehicle.

11. The vehicle as set out in claim 10, wherein said vehicle controller reduces the desired traction control signal at a predefined rate until the calculated acceleration of said one driven wheel is no longer increasing in magnitude.

12. The vehicle as set out in claim 11, wherein said vehicle controller maintains the desired traction control signal at a constant value after said vehicle controller determines that the calculated acceleration of said one driven wheel is no longer increasing in magnitude.

13. The vehicle as set out in claim 12, wherein said vehicle controller is allowed to increase the desired traction control signal in magnitude if said vehicle controller determines that unacceptable slip is not occurring at said driven wheel.

14. The vehicle as set out in claim 10, wherein said vehicle controller determines that unacceptable slip is occurring at said driven wheel if the calculated acceleration magnitude of said one driven wheel is greater than either of value (1) or value (2):

$$((\text{the calculated acceleration magnitude of said vehicle}) \times A) + B = \text{value (1)}$$

$$(\text{the calculated acceleration magnitude of said vehicle}) + C = \text{value (2)}$$

wherein A, B and C are constants.

15. A vehicle comprising:
a main body;
a plurality of wheels coupled to said main body;
a traction motor associated with said main body and coupled to at least one of said wheels for driving said one wheel;
control apparatus coupled to said fraction motor and generating a motor drive signal to said traction motor;
a first sensor for generating a speed signal indicative of a speed of said driven wheel; and
said control apparatus calculating acceleration of said one wheel using changes in said speed signal over time and calculating an acceleration of said vehicle using forces acting on said vehicle and a mass of said vehicle, wherein said control apparatus further estimating if unacceptable slip is occurring at said driven wheel based on a comparison of said calculated acceleration of said wheel and said calculated acceleration of said vehicle.

16. The vehicle as set out in claim 15, wherein said control apparatus calculates a value corresponding to vehicle roll resistance, said control apparatus using the vehicle roll resistance along with the torque applied by said traction motor when determining the forces acting on the vehicle.

17. The vehicle as set out in claim 15, wherein said control apparatus determines that unacceptable slip is occurring at said driven wheel if the calculated acceleration magnitude of said one driven wheel is greater than either of value (1) or value (2):

$$((\text{the calculated acceleration magnitude of said vehicle}) \times A) + B = \text{value (1)}$$

$$(\text{the calculated acceleration magnitude of said vehicle}) + C = \text{value (2)}$$

wherein A, B and C are constants.

* * * * *

UNITED STATES PATENT AND TRADEMARK OFFICE
CERTIFICATE OF CORRECTION

PATENT NO. : 8,131,422 B2
APPLICATION NO. : 12/432044
DATED : March 6, 2012
INVENTOR(S) : Eric L. Jensen et al.

Page 1 of 1

It is certified that error appears in the above-identified patent and that said Letters Patent is hereby corrected as shown below:

Col. 7, lines 32-33, "A "percent slip" may be define as a ratio of a distance" should read
-- A "percent slip" may be defined as a ratio of a distance --.

Signed and Sealed this
Fifth Day of February, 2013

Teresa Stanek Rea
*Acting Director of the United States Patent and Trademark Office*